June 18, 1957 D. ALBERT 2,796,043
BIRD PERCH
Filed May 28, 1956
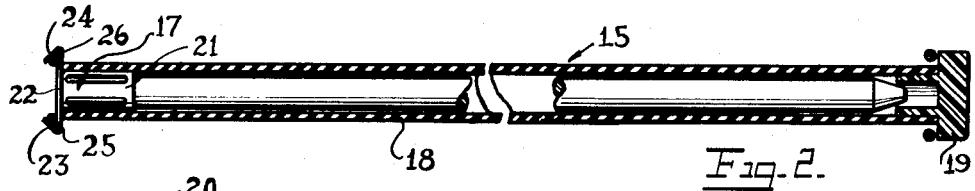
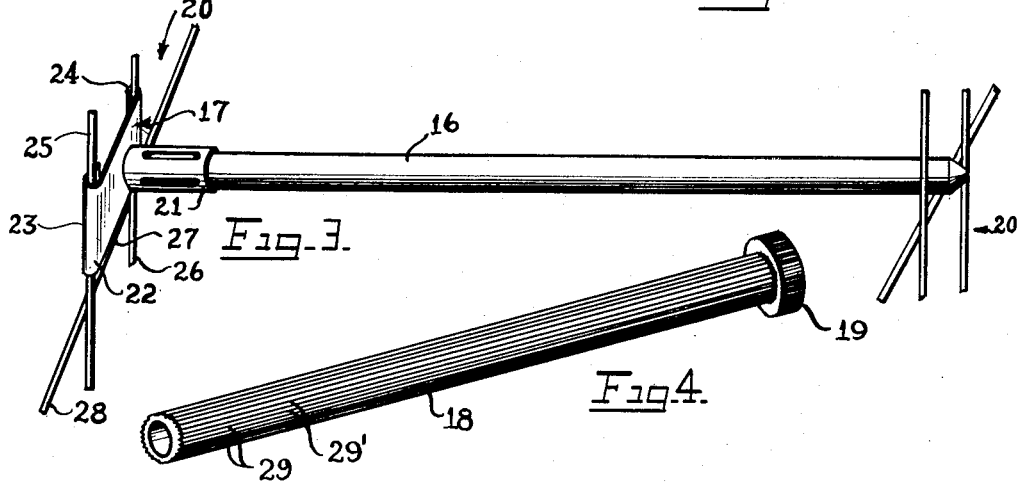
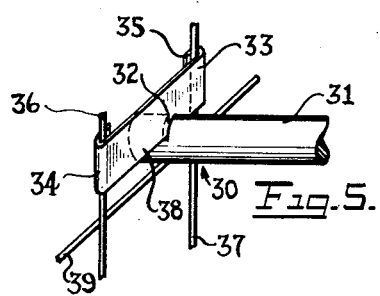
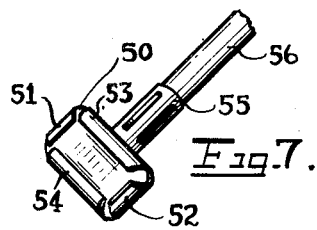
INVENTOR.
DANIEL ALBERT
BY
*Zoltan Holochek*
ATTORNEY.

United States Patent Office 2,796,043
Patented June 18, 1957

2,796,043
BIRD PERCH
Daniel Albert, Brooklyn, N. Y.
Application May 28, 1956, Serial No. 587,578
10 Claims. (Cl. 119—26)

This invention relates to new and useful improvements in perches for bird cages, particularly for small birds such as canaries, finches and the like.

More particularly, the present invention proposes the construction of an improved perch which can be cleaned without reaching into the cage and without disturbing, frightening or causing any damage to the bird or birds in the cage.

As a further object, the present invention proposes forming a perch which will afford greater simplicity of operation and more comfort and sanitary conditions than present-day perches.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side view of a perch constructed and arranged in accordance with the present invention.

Fig. 2 is a sectional view taken on line 2—2 of Fig. 1 but also showing some vertical wires or members of a cage.

Fig. 3 is a perspective fragmentary view of a cage and of the rod and end fastener member shown in Figs. 1 and 2.

Fig. 4 is a perspective view of the sleeve and handle shown in Figs. 1 and 2.

Fig. 5 is a fragmentary view similar to Fig. 3 but illustrating a modification of the present invention.

Fig. 6 is a view similar to Fig. 3 but illustrating another modification of the invention.

Fig. 7 is a fragmentary perspective view showing a further modification of the invention.

Referring more particularly to the drawings, the perch in the first form of the invention shown in Figs. 1 to 4, inclusive, is designated generally by the reference numeral 15.

Perch 15 comprises a rod 16, a rod end fastener member 17, and a resilient stiffly flexible sleeve 18 preferably of plastic or rubber material with a handle knob 19 at one end. However, this sleeve may also be made of metal or any other suitable material for destructive pets such as parakeets.

The perch rod 16 may be made of wood, metal, plastic or any other rigid material. A wooden dowel rod one-fourth of an inch in diameter is an inexpensive and satisfactory rod for this purpose. Rod 16 should be of a length to extend across portions of a wire cage body 20 such as between corner portions or across the cage from side to side.

One end of the perch rod 16 is firmly attached to the side wires or members of a cage by the fastener member 17. This fastener member is a slotted ferrule 21 secured at one end to a cross member or plate 22 having cage wire engaging opposed clasps or crook portions 23 and 24 adapted removably to clamp onto two spaced vertical wires or members 25 and 26 of cage 20. The distance between the clasp portions 23 and 24 may be suitably changed to fit cage wires 25 and 26 by forming or bending these clasps projections by hand. The bottom edge 27 of the plate or cross member 22 may rest on one of the horizontal wires or members 28 of the cage. One end of the perch rod 16 tightly fits in the slotted ferrule 21 while the other end is unattached and rests free and flush on the other side of the cage. This free end can either rest on the cage without sticking out of the cage or can be held by the ferrule without any support from the other side of the cage.

Sleeve 18 is tubular and is corrugated with spaced ribs 29 and grooves 29′ extending lengthwise of the sleeve the entire length of the sleeve. A corrugated rubber tube has been found to be excellent and inexpensive for this purpose, the tube having an inside diameter slightly greater than the outside diameter of the rod so as freely to slide on and off the rod.

Sleeve 18 is of a length to cover the rod entirely and slips over the free unattached end of the rod from outside the cage to protect the rod against droppings. Sleeve 18 has an end grasping portion disposed outside the cage for sliding the sleeve on and off the rod without opening the cage and this end portion fits on the handle or handle knob 19 which may be of plastic or other rigid or semirigid material. The knob or handle 19 is disposed outside the cage but not far enough out to catch on any passing object.

By removing the tube or sleeve 18 from the perch rod the tubes can be cleaned for a set of five perches in about three minutes with leisure, whereas it would take from twenty to thirty minutes to clean conventional perches. This cleaning is done without the necessity of opening a cage door and while the sleeve is being cleaned the pet or pets can perch upon the rod comfortably.

For destructive pets, the sleeve 18 may be made of metal either smooth or corrugated.

The modification of the invention illustrated in Fig. 5 is characterized by the provision of a perch 30 having a rod 31 with a latch plate slot recess 32 adjacent one end. A cross member 33 is provided with cage wire engaging opposed crook portions or clamps 34 and 35 to hook over vertical wires 36 and 37 of a cage. Member 33 also has a central latch plate portion 38 which seats in the slot recess 32 of the rod 31 when the end of the rod is resting on a horizontal cross wire 39 of the cage. This holds the rod 31 horizontally disposed in the cage.

The modification of the invention illustrated in Fig. 6 is characterized by the provision of a perch rod 40 with an integral end plate 41 having spaced cage wire engaging and seating grooves 42. The distance between the two pairs at opposite seating grooves are different.

In Fig. 7, the end plate 50 is shown with two pairs of bent clamp fingers 51, 52 and 53, 54. The opposite fingers may be bent by hand or preformed to correspond with various cage wire spacings. The ferrule 55 and the perch rod 56 are similar to the illustrations shown in the previous forms of the invention.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a bird cage having a body with spaced wires, a bird perch comprising a rod of a length to extend across portions of the body, fastener means to secure one end of the rod to one side of the body, and a resilient stiffly flexible corrugated sleeve freely and removably slidable over the unsecured end of the rod and over the rod completely to cover the rod and having an end grasping portions disposed outside the cage body for sliding the sleeve on and off the rod without opening the cage body, said fastener means being a slotted ferrule secured to a cross member having cage wire engaging opposed crook portions.

2. A perch for bird cages comprising a rod of a length to extend across portions of a cage, fastener means to secure one end of the rod to one side of a cage, and a resilient stiffly flexible sleeve freely slidable over the unsecured end of the rod and over the rod completely to cover the rod and having an end grasping portion disposed outside the cage for sliding the sleeve on and off the rod without opening the cage, said fastener means being formed integral with the rod and being an end plate with spaced cage wire engaging and seating grooves.

3. A perch for bird cages comprising a rod of a length to extend across portions of a cage, fastener means to secure one end of the rod to one side of a cage, and a resilient stiffly flexible sleeve freely slidable over the unsecured end of the rod and over the rod completely to cover the rod and having an end grasping portion disposed outside the cage for sliding the sleeve on and off the rod without opening the cage, said fastener means being a cross member having cage wire engaging opposed crook portions adapted removably to hook over vertical cage wires and a central latch plate portion, said rod having a latch plate slot recess adjacent one end to seat the latch plate portion of the cross member when said end of the rod is resting on a horizontal cross wire of the cage.

4. In a bird cage having a body with spaced wires, a bird perch comprising a rod of a length to extend across portions of the body, fastener means to secure one end of the rod to one side of the body, a resilient stiffly flexible corrugated sleeve freely and removably slidable over the unsecured end of the rod and over the rod completely to cover the rod and having an end grasping portion disposed outside the cage body for sliding the sleeve on and off the rod without opening the cage body, and a removable handle knob secured to the end grasping portion of the sleeve for disposal outside the cage body.

5. In a bird cage having a body with spaced wires, a bird perch comprising a rod of a length to extend across portions of the body, fastener means to secure one end of the rod to one side of the body, a resilient stiffly flexible corrugated sleeve freely and removably slidable over the unsecured end of the rod and over the rod completely to cover the rod and having an end grasping portion disposed outside the cage body for sliding the sleeve on and off the rod without opening the cage body, said fastener means being a slotted ferrule secured to a cross member having cage wire engaging opposed crook portions, and a removable rigid handle secured to the end grasping portion of the sleeve.

6. A perch for bird cages comprising a rod of a length to extend across portions of a cage, fastener means to secure one end of the rod to one side of a cage, and a resilient stiffly flexible sleeve freely slidable over the unsecured end of the rod and over the rod completely to cover the rod and having an end grasping portion disposed outside the cage for sliding the sleeve on and off the rod without opening the cage, said fastener means being formed integral with the rod and being an end plate with spaced cage wire engaging and seating grooves, said sleeve being corrugated with spaced lengthwise ribs and grooves extending the length of the sleeve.

7. A perch for bird cages comprising a rod of a length to extend across portions of a cage, fastener means to secure one end of the rod to one side of a cage, a resilient stiffly flexible sleeve freely slidable over the unsecured end of the rod and over the rod completely to cover the rod and having an end grasping portion disposed outside the cage for sliding the sleeve on and off the rod without opening the cage, said fastener means being formed integral with the rod and being an end plate with spaced cage wire engaging and seating grooves, said sleeve being corrugated with spaced lengthwise ribs and grooves extending the length of the sleeve, and a handle knob secured to the end grasping portion of the sleeve for disposal outside a cage.

8. A perch for bird cages comprising a rod of a length to extend across portions of a cage, fastener means to secure one end of the rod to one side of a cage, a resilient stiffly flexible sleeve freely slidable over the unsecured end of the rod and over the rod completely to cover the rod and having an end grasping portion disposed outside the cage for sliding the sleeve on and off the rod without opening the cage, said fastener means being a cross member having cage wire engaging opposed crook portions adapted removably to hook over vertical cage wires and a central latch plate portion, said rod having a latch plate slot recess adjacent one end to seat the latch plate portion of the cross member when said end of the rod is resting on a horizontal cross wire of the cage, said sleeve being a corrugated rubber tube, and a rigid handle secured to the end grasping portion of the sleeve.

9. A perch for bird cages comprising a rod of a length to extend across portions of a cage, fastener means to secure one end of the rod to one side of a cage, a resilient stiffly flexible sleeve freely slidable over the unsecured end of the rod and over the rod completely to cover the rod and having an end grasping portion disposed outside the cage for sliding the sleeve on and off the rod without opening the cage, said fastener means being a ferrule secured to a cross member having cage wire engaging two pairs of opposed, differently spaced crook portions, and a rigid handle secured to the end grasping portion of the sleeve.

10. In combination with adjacent wires of a bird cage, a bird perch comprising a supporting plate having opposed crook portions at its ends adapted to engage said wires, an integral slotted ferrule extending radially from the center of said plate, a perch rod secured at one end in said ferrule, a flexible sleeve slidably and removably mounted on said rod, one end of said sleeve contacting said plate, the other end of said sleeve extending beyond the adjacent end of the rod, and a handle knob removably plugged into said latter end of the sleeve.

References Cited in the file of this patent

UNITED STATES PATENTS

| | | |
|---|---|---|
| 1,951,550 | Little | Mar. 20, 1934 |
| 2,076,734 | Leindorf | Apr. 13, 1937 |